United States Patent
West et al.

(10) Patent No.: US 9,038,789 B2
(45) Date of Patent: May 26, 2015

(54) METHOD AND APPARATUS FOR CONTROLLING AN ELASTOMERIC DAMPER

(75) Inventors: Colin John West, Pontypridd (GB); David Alistair Sutton, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 343 days.

(21) Appl. No.: 13/010,063

(22) Filed: Jan. 20, 2011

(65) Prior Publication Data

US 2011/0180684 A1 Jul. 28, 2011

(30) Foreign Application Priority Data

Jan. 22, 2010 (GB) .................................. 1000983.5

(51) Int. Cl.
*F16F 15/03* (2006.01)
*F16F 1/36* (2006.01)
*F16F 1/379* (2006.01)
*B64D 27/26* (2006.01)

(52) U.S. Cl.
CPC ............... *F16F 1/3615* (2013.01); *B64D 27/26* (2013.01); *F16F 1/379* (2013.01)

(58) Field of Classification Search
USPC ............................ 188/266, 267.1, 267.2, 268
See application file for complete search history.

(56) References Cited

U.S. PATENT DOCUMENTS

| | | | | |
|---|---|---|---|---|
| 3,242,791 A * | 3/1966 | Smith | ........................... | 188/379 |
| 4,724,923 A * | 2/1988 | Waterman | ..................... | 181/208 |
| 5,065,959 A | 11/1991 | Bhatia et al. | | |
| 5,366,210 A * | 11/1994 | Grunau et al. | ............. | 267/140.4 |
| 5,396,973 A * | 3/1995 | Schwemmer et al. | ..... | 188/267.1 |
| 5,814,999 A | 9/1998 | Elie et al. | | |
| 5,816,587 A * | 10/1998 | Stewart et al. | ............. | 280/5.516 |
| 6,059,274 A * | 5/2000 | Owen et al. | .................... | 267/136 |
| 6,082,719 A * | 7/2000 | Shtarkman et al. | ...... | 267/140.14 |
| 7,086,507 B2 * | 8/2006 | Hitchcock et al. | ......... | 188/267.2 |
| 7,261,834 B2 * | 8/2007 | Fuchs et al. | ................ | 252/62.53 |
| 7,401,845 B2 * | 7/2008 | Alexander et al. | ....... | 296/187.01 |
| 8,152,145 B2 * | 4/2012 | Anderson | ................ | 267/140.14 |
| 2003/0070892 A1* | 4/2003 | Iyengar et al. | ............. | 188/267.2 |

FOREIGN PATENT DOCUMENTS

| | | |
|---|---|---|
| EP | 0290328 | 11/1988 |
| EP | 0429100 | 5/1991 |
| WO | 02090105 | 11/2002 |

OTHER PUBLICATIONS

UK Search Report for Application No. GB1000983.5 mailed May 10, 2010.

* cited by examiner

*Primary Examiner* — Christopher Schwartz
(74) *Attorney, Agent, or Firm* — Lowe Hauptman & Ham, LLP

(57) ABSTRACT

A method of controlling an elastomeric damper. The damper is heated by passing an electric current through the damper or through a heating element in contact with the damper said heating causing a decrease in stiffness of the damper. The elastomeric damper may comprise an elastomeric material filled with electrically conductive particles, and the damper may be heated by passing an electric current through the elastomeric material. Alternatively the damper may be heated using a discrete resistive heating element, such as a coil embedded within the elastomeric damper or wound around it.

11 Claims, 4 Drawing Sheets

METHOD AND APPARATUS FOR CONTROLLING AN ELASTOMERIC DAMPER

RELATED APPLICATIONS

The present application is based on, and claims priority from, Great Britain Application Number 1000983.5, filed Jan. 22, 2010, the disclosure of which is hereby incorporated by reference herein in its entirety.

FIELD OF THE INVENTION

The present invention relates to a method of controlling an elastomeric damper, and vibration damping apparatus comprising an elastomeric damper. The invention is preferably, although not exclusively, used to minimise the transfer of vibrations produced by an aircraft engine to the aircraft cabin.

BACKGROUND OF THE INVENTION

Elastomeric vibration dampeners are currently used on motor vehicles and aircraft, an example being given in EP-A-0429100. These dampers require the elastomer to absorb input frequencies over a wide temperature range.

In order for an elastomer to operate effectively as a vibration dampener the temperature has to be maintained within an optimum range. If an elastomer is cooled below its Tg (glass transition temperature) it is unable to deform as before without damage to its structure.

SUMMARY OF THE INVENTION

A first aspect of the invention provides a method of controlling an elastomeric damper, the method comprising heating the damper by passing an electric current through the damper or through a heating element in contact with the damper, said heating causing a decrease in stiffness of the damper.

A further aspect of the invention provides vibration damping apparatus comprising an elastomeric damper; and a temperature control system configured to heat the damper by passing an electric current through the damper or a heating element in contact with the damper, said heating causing a decrease in stiffness of the damper.

For example the elastomeric damper may comprise an elastomeric material filled with electrically conductive particles, and the damper may be heated by passing an electric current through the elastomeric material. Alternatively the damper may be heated using a discrete resistive heating element, such as a coil embedded within the elastomeric damper or wound around it.

Preferably the method further comprises receiving a control input, and controlling the electric current in accordance with the control input. This control input may comprise, for example, a feedback parameter which is indicative of the temperature of the damper and/or an open loop control parameter indicating a frequency of vibration to be damped by the damper.

The feedback parameter may be a parameter of the elastomeric damper (such as its temperature or electrical resistance) or it may be any other parameter which is either directly or indirectly indicative of the temperature of the damper. For instance it may be a parameter indicating the frequency or amplitude of vibration being transferred by the damper.

The elastomeric damper is preferably positioned, when in use, between a pair of components so as to reduce the transfer of vibration between them. For instance one of the components may comprise the airframe of an aircraft, and the other one of the components may comprise a strut attaching an engine to the airframe.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
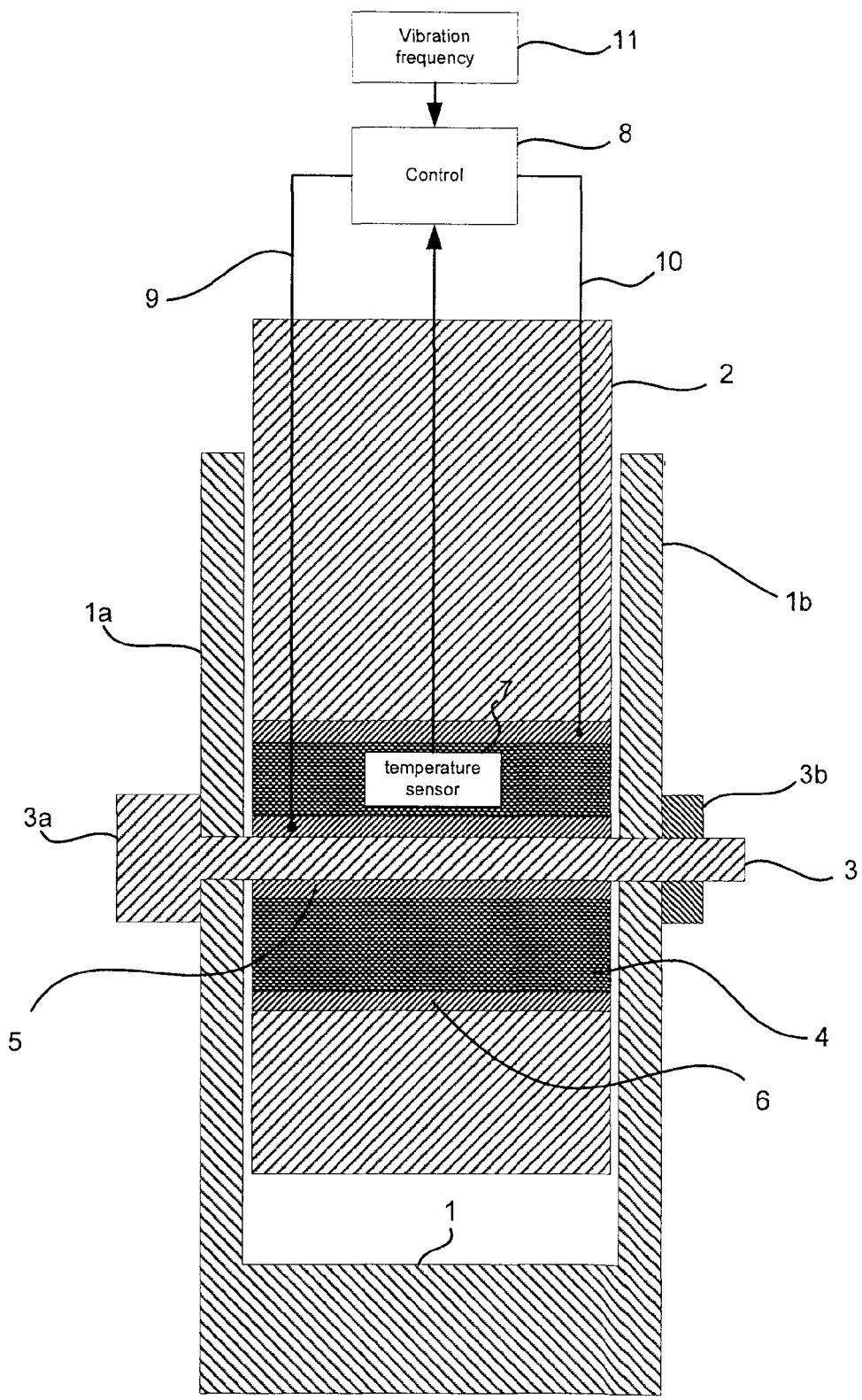
FIG. 1 is a schematic cross-section through an attachment between an airframe and an engine strut incorporating vibration damping apparatus according to a first embodiment of the invention.

FIG. 1 is a sectional view through a joint between an airframe component 1 and an engine strut 2. The airframe component 1 has a pair of arms 1a, 1b which receive the engine strut 2 between them. A fastener with a shaft 3, head 3a and nut 3b joins the components 1, 2 together. The shaft 3 passes through holes in the engine strut 2 and arms 1a, 1b. By way of example, the airframe component 1 may be part of the fuselage of an aircraft, and the engine strut 2 may be an arm which connects an open rotor engine to the fuselage.

A cylindrical rubber damper 4 is interposed in the load path between the two components 1, 2 so that it reduces the transfer of vibrations from the engine strut 2 to the airframe component 1.

The damper 4 carries a cylindrical metallic inner sleeve 5 which acts as a positive electrode and a cylindrical metallic outer sleeve 6 which acts as a negative electrode. The electrodes 5, 6 are coupled to a control system 8 by a pair of control lines 9, 10.

The electrodes 5, 6 may be electrically insulated from the fastener shaft 3 and the engine strut 2 by layers of insulating material (not shown). Additionally the fastener shaft 3 and/or the engine strut 2 may be formed from an electrically insulating composite material such as glass-fibre reinforced epoxy resin.

The damper 4 carries an embedded temperature sensor 7 which provides a feedback control input to the control system 8 by providing an indication of the temperature of the damper 4. The sensor 7 may measure the rubber temperature in a number of ways, including for example infrared reflectance, or using a thermocouple.

The damper 4 comprises an elastomeric material such as polyisoprene filled with electrically conductive particles such as silver, carbon black or carbon nanotubes which are dispersed throughout the damper 4. This enables the control system 8 to control the temperature of the damper by controlling an electric current flowing between the electrodes 5, 6 through the damper 4. Thus the control system 8 is configured to control the temperature of the damper by resistive heating in accordance with the temperature readings received from the sensor 7.

Heating the elastomeric damper decreases its stiffness. Conversely, allowing it to cool increases its stiffness. Specifically, the conductive elastomeric material is heated by the control system 8 to ensure that the elastomer is above its minimum operating temperature. Once in operation the temperature of the elastomer will also be raised due to movement/loading of the elastomer.

The use of a vibration damper formed from an elastomeric material filled with electrically conductive particles is particularly advantageous on an aircraft since it provides a path for electric current to flow between the components, preventing sparking due to static discharge or the flow of lightning current.

Throughout a flight cycle the vibration frequencies from the engines change, altering the dampening requirements. Therefore the control system 8 also has an open loop control input module 11 which enables the control system 8 to perform dynamic vibration control to optimise vibration dampening.

The module 11 may simply be a software entity which indicates to the control system 8 when a particular phase of a flight cycle has been entered (for instance take off, climb, cruise, descent etc.) and the control system 8 controls the temperature of the damper accordingly. Alternatively the control input module 11 may be a sensor which directly measures the vibration of the engine and inputs this to the control system 8 which controls the temperature of the damper accordingly. For example if the vibration frequency increases then the elastomer may be allowed to cool and stiffen by reducing the flow of current, and if the vibration frequency decreases then the elastomer may be heated by increasing the flow of current to decrease its stiffness.

Figure 2:
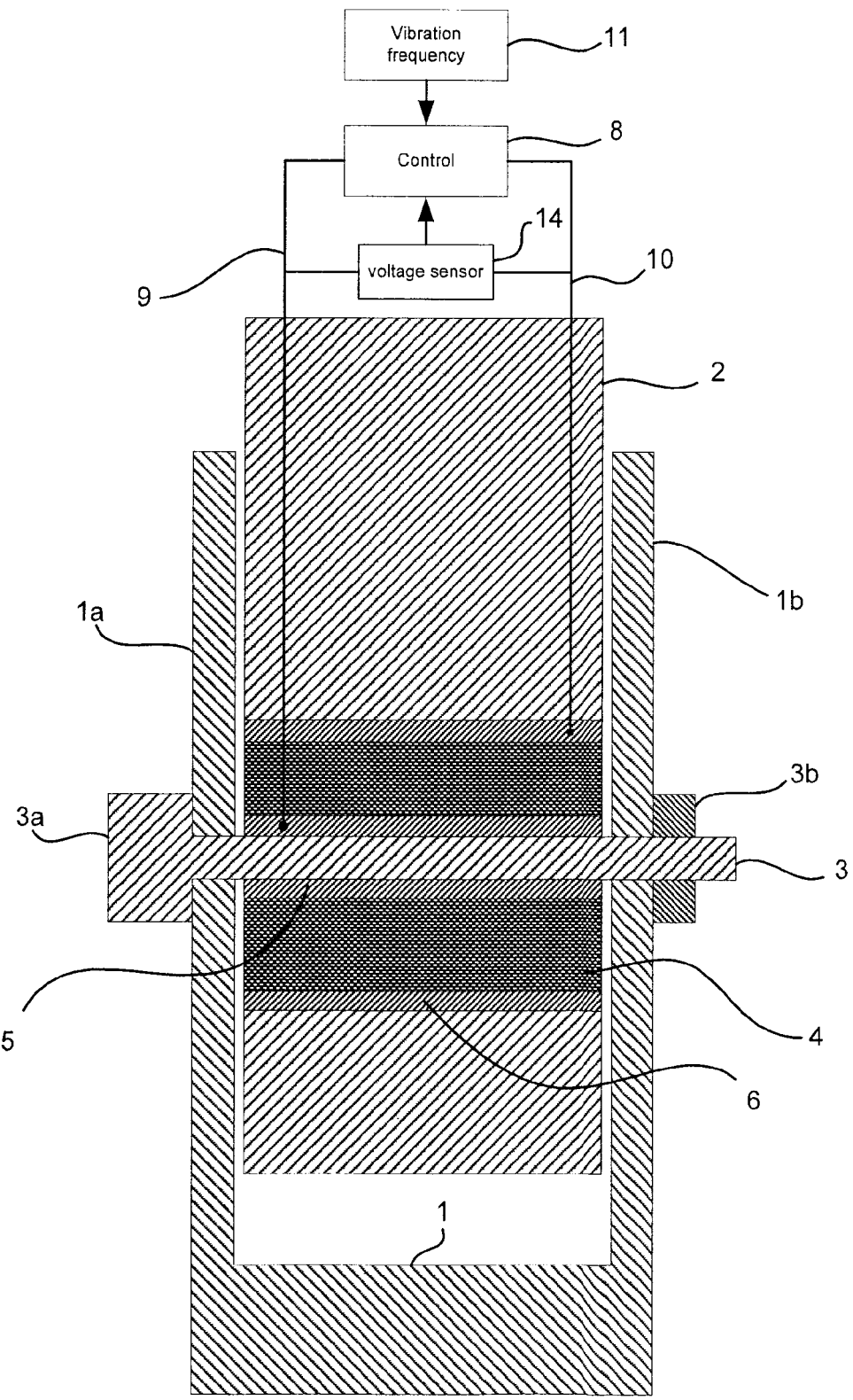
FIG. 2 is a schematic cross-section through an attachment between an airframe and an engine strut incorporating vibration damping apparatus according to a second embodiment of the invention.

FIG. 2 illustrates a first alternative method of providing a feedback signal indicative of the temperature of the damper. In this case, instead of measuring the temperature of the damper directly, its temperature is inferred by measuring its electrical resistance. Thus a voltage sensor 14 measures the voltage between the control lines 9, 10 and the control system 8 infers the resistance as the ratio of voltage divided by current.

Figure 3:
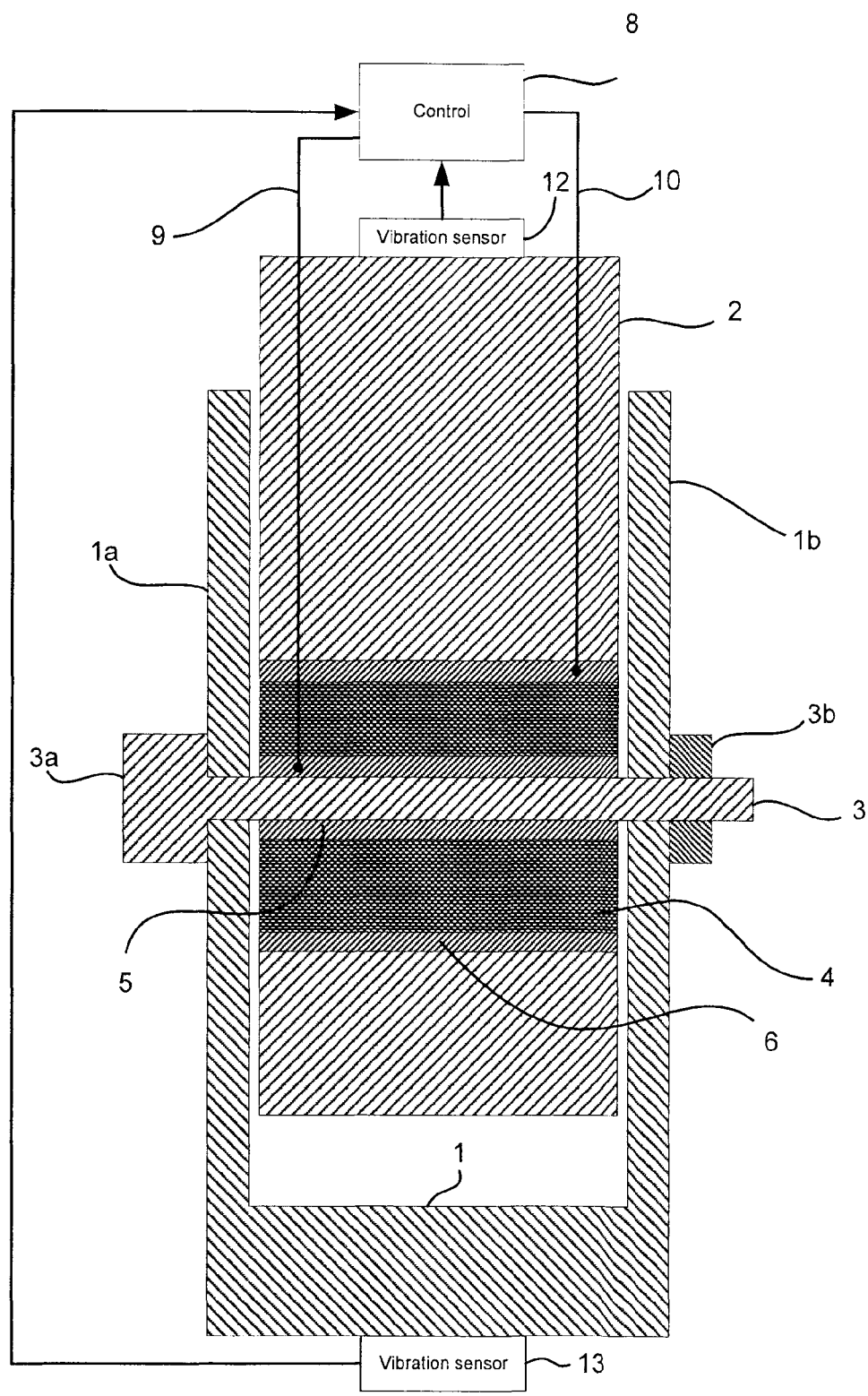
FIG. 3 is a schematic cross-section through an attachment between an airframe and an engine strut incorporating vibration damping apparatus according to a third embodiment of the invention.

FIG. 3 illustrates a second alternative method of providing a feedback signal indicative of the temperature of the damper. In this case, instead of measuring a parameter of the damper 4, a vibration sensor 13 measures the frequency and/or amplitude of vibration of the airframe component 1 and provides this as a feedback signal to the control system 8. This feedback parameter is less directly indicative of the temperature of the damper, but will still vary in accordance with the temperature of the damper and thus can be used to provide feedback to the control system 8.

FIG. 3 also shows an alternative open loop control input module, comprising a sensor 12 which directly measures the vibration of the engine strut 2 and inputs this to the control system 8 which controls the temperature of the damper accordingly.

Figure 4:
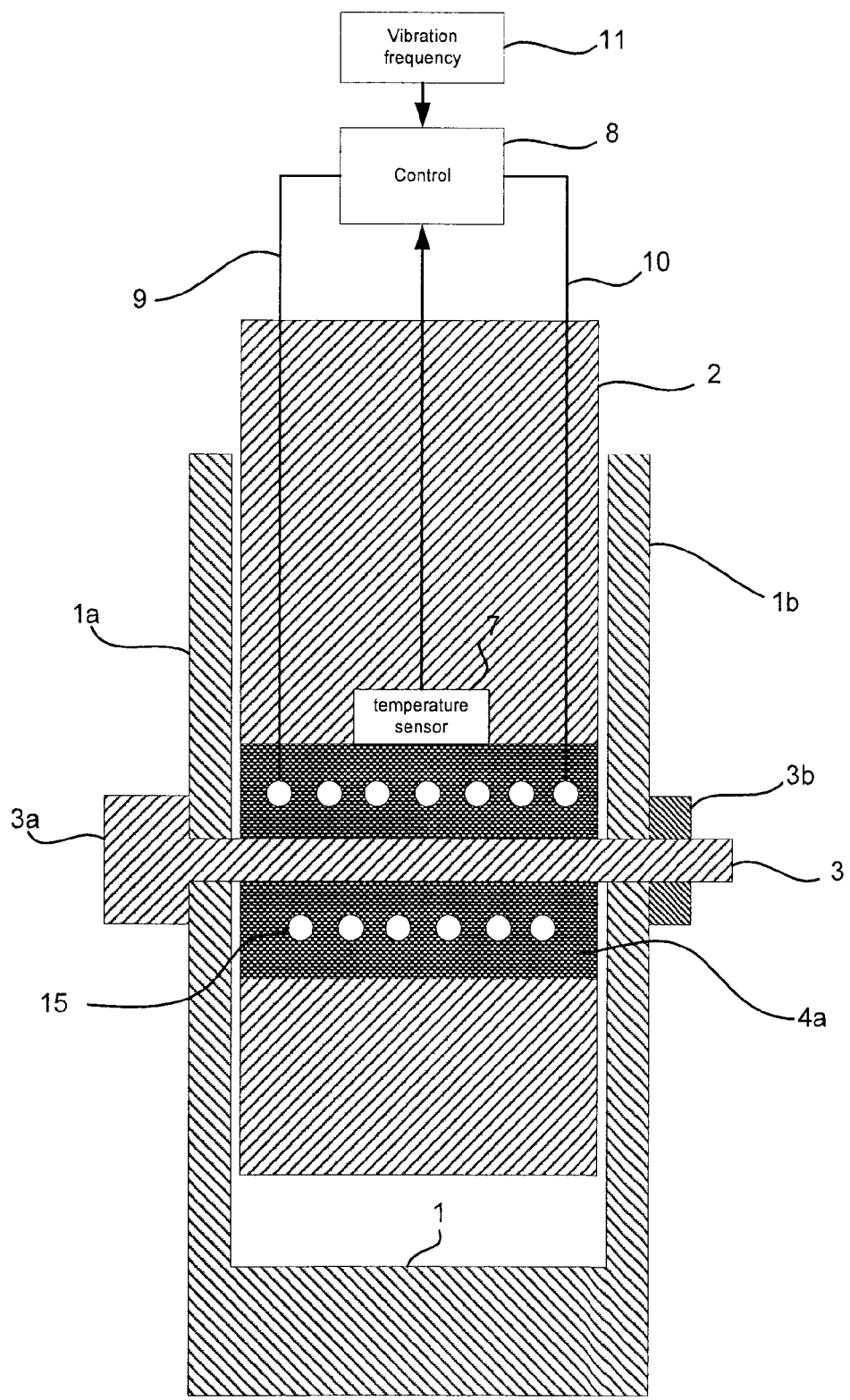
FIG. 4 is a schematic cross-section through an attachment between an airframe and an engine strut incorporating vibration damping apparatus according to a fourth embodiment of the invention.

FIG. 4 shows an alternative method of heating the damper. In this case the elastomeric vibration damper 4a is not filled with electrically conductive particles, and is heated by a coil 15 embedded within it.

Although the invention has been described above with reference to one or more preferred embodiments, it will be appreciated that various changes or modifications may be made without departing from the scope of the invention as defined in the appended claims.

The invention claimed is:

1. A vibration damping apparatus in an aircraft having an airframe structure and an aircraft component, comprising:
    an elastomeric damper;
    said elastomeric damper comprising an elastomeric material filled with electrically conductive particles;
    a temperature sensor disposed on said elastomeric damper;
    a temperature control system configured to heat the elastomeric damper by passing an electric current through the elastomeric damper, wherein as the elastomeric damper is heated by increasing the flow of the electric current, the stiffness of the elastomeric damper is decreased;
    said temperature sensor providing a feedback control to said control system;
    wherein the elastomeric damper is interposed in the load path between said aircraft airframe structure and said aircraft component; and,
    wherein said temperature control system includes an open loop control input module enabling the control system to perform dynamic vibration control to optimize vibration damping.

2. The vibration damping apparatus of claim 1, further comprising a cylindrical metallic outer sleeve and a cylindrical metallic inner sleeve, wherein said elastomeric damper carries said cylindrical metallic outer sleeve and said cylindrical metallic inner sleeve.

3. The vibration damping apparatus of claim 1, wherein the temperature sensor embedded within said elastomeric damper.

4. The vibration damping apparatus of claim 1, wherein said aircraft component comprises a strut for attaching an aircraft engine to said airframe structure.

5. The vibration damping apparatus of claim 1, wherein the feedback parameter is a temperature or resistance parameter of the elastomeric damper.

6. A method of controlling vibration damping in an aircraft having an airframe structure and an aircraft component, comprising:
    providing an elastomeric damper comprising an elastomeric material filled with electrically conductive particles;
    providing a temperature sensor on said elastomeric damper;
    providing a pair of electrodes in contact with the elastomeric damper;
    providing a temperature control system configured to heat the elastomeric damper by passing an electric current through the elastomeric damper;
    interposing said elastomeric damper in the load path between said aircraft airframe structure and said aircraft component; and,
    heating the elastomeric damper by increasing the flow of the electric current to decrease the stiffness of elastomeric damper;
    providing a control system, said control system controlling the temperature of said elastomeric damper by resistive heating; and,
    providing an open loop control input module allowing the control system to perform dynamic vibration control to optimize vibration damping.

7. The vibration damping apparatus of claim 6, further comprising a cylindrical metallic outer sleeve and a cylindrical metallic inner sleeve, wherein said elastomeric damper carries said cylindrical metallic outer sleeve and said cylindrical metallic inner sleeve.

8. The vibration damping apparatus of claim 6, further comprising embedding the temperature sensor within said elastomeric damper.

9. The method of claim 6, wherein said aircraft component comprises a strut for attaching an aircraft engine to said airframe structure.

10. The method of claim 6, wherein the feedback parameter is a temperature or resistance parameter of the elastomeric damper.

11. The method of claim 6, wherein the control input is a frequency characteristic of a vibration to be dampened by the elastomeric damper.

* * * * *